Patented May 19, 1936

2,040,825

UNITED STATES PATENT OFFICE 2,040,825

TREATING MIXED OXIDES OF LEAD, TIN, AND ZINC

Jesse O. Betterton and Albert J. Phillips, Metuchen, N. J., assignors to American Smelting and Refining Company, New York, N. Y., a corporation of New Jersey No Drawing. Application November 13, 1933, Serial No. 697,809

13 Claims. (Cl. 75—25)

This invention relates to the treatment of brass, bronze and miscellaneous copper alloy scrap to recover the metallic values contained therein and particularly concerns an improved process of treating mixed metallic oxides such as are ordinarily produced when secondary metals of the kind described are treated in a converter.

The invention provides a process whereby zinc is efficiently separated from a mixture of oxides of lead, tin and zinc, while at the same time the lead and tin are readily recovered as solder in marketable form.

In salvaging brass or bronze secondary metal, the material is commonly oxidized in a converter or other furnace with the result that the lead, tin and zinc are removed from the copper as a mixed dust or fume and are collected in a baghouse, Cottrell plant, settling chamber or other means. Because of its heterogeneous composition, the treatment of this dust or fume is somewhat complicated and while it is possible, as shown in our co-pending application Serial No. 701,338 filed December 7, 1933, to divide this fume into two classifications (the first—high in zinc with little tin and the second—high in tin with subordinate amounts of lead and zinc) nevertheless even the high tin fume contains considerable quantities of zinc oxide which precludes directly reducing the lead and tin oxides to marketable solder. Hence, some treatment must be practised to eliminate the zinc oxide from the lead and tin and a heretofore common method was to selectively leach the mixed oxides, as for example with sulphuric acid, to remove the zinc.

By the present invention, the mixed oxides resulting from the converter treatment of the copper alloy scrap are smelted with carbon in the presence of a moving reducing atmosphere. It has been found that by this treatment all of the zinc can be volatilized and recovered as zinc oxide or blue powder, while by the same operation the lead and tin are reduced to solder, thus eliminating intermediate steps such as leaching which have heretofore been commonly employed.

In order to fully illustrate the advantages of the invention and the manner in which same may be practiced, attention is directed to the following specific examples:

Example 1

Scrap radiators were treated in an ordinary converter and blown with air to remove the lead, tin and zinc as oxides. To 150 parts by weight of these mixed oxides analyzing 23.2% lead, 39.4% tin and 20.1% zinc, 12.5 parts by weight of coke were added. The mixture was then heated at a temperature of approximately 2300° F. for about three hours in the presence of a reducing atmosphere at all times. As a result all of the zinc was volatilized and recovered as fume, while the metal 85 parts by weight was analyzed and found to comprise 62.8% tin and 35.8% lead with only a bare trace of zinc.

Example 2

In this run the mixed oxides analyzing 27.2% lead, 43.55% tin and 12.33% zinc were mixed with 8% of coke and pulped with water to facilitate handling. The material was charged to a furnace and fired with a strongly reducing flame in contact with the charge at a temperature of 2350° F.–2400° F. Over 99% of the zinc was eliminated as fume in about two and one-half hours and the metal which contained 55.5% of the lead, 86.3% of the tin and only 0.04% of the zinc in the original mixture of oxides analyzed 28.78% lead, 71.2% tin and 0.01% zinc.

It will thus be appreciated that the present invention provides an efficient process for separating the zinc from a mixture of lead, tin and zinc oxides such as is obtained in the converter treatment of copper alloy scrap and obtaining the lead and tin in a readily marketable form of solder.

It is believed the success of the invention may be explained in part on the basis that when the oxides are heated with carbon at temperatures of about 1800° F.—2500° F. the zinc oxide is reduced in proportion to the partial pressure of carbon monoxide in contact with the material. By sweeping reducing gases over the material the zinc oxide being reduced to the metallic state is volatilized and carried away thus allowing more zinc to be volatilized. Thus, it is possible to completely remove the zinc at a temperature below and with a lower partial pressure of carbon monoxide than that which can normally be used for the distillation of zinc.

While certain novel features of the invention have been disclosed and are pointed out in the annexed claims, it will be understood that various omissions, substitutions and changes may be made by those skilled in the art without departing from the spirit of the invention.

What is claimed is:

1. The process for treating mixed oxides of lead, tin and zinc which comprises smelting said oxides at a temperature of approximately 1800–2500° F. in the presence of a carbonaceous reducing agent and subjecting the charge to the sweeping action of a reducing atmosphere thereby simultaneously eliminating the zinc by volatilization and recovering the lead and tin as liquid metal.

2. The process for refining copper alloy scrap which comprises treating same in a converter thereby separating lead, tin and zinc as mixed oxides and smelting said oxides with carbon while passing reducing gases over the charge thereby volatilizing the zinc and reducing the lead and tin to liquid metal.

3. The process for separating zinc from a mixture of lead, tin and zinc oxides which comprises smelting a charge of such oxides with carbon while sweeping same with a reducing atmosphere thereby volatilizing the zinc and reducing the lead and tin to solder.

4. In reclaiming scrap brass and bronze, the process which comprises treating the scrap in a converter thereby eliminating lead, tin and zinc from the copper as oxides, mixing said oxides with a suitable quantity of coke and smelting the charge in the presence of a moving, reducing atmosphere whereby the zinc is volatilized and the lead and tin reduced to the metallic state.

5. In refining mixed oxides of lead, tin and zinc, the improved process which comprises volatilizing the zinc and reducing the tin and lead to liquid metal by smelting such oxides with carbon in the presence of a moving, reducing atmosphere.

6. The process for treating mixed oxides of lead, tin and zinc which comprises mixing a carbonaceous reducing agent with the mixed oxides and smelting the resulting mixture in a moving reducing atmosphere at temperatures of from approximately 1800° F. to approximately 2500° F. thereby volatilizing the zinc and removing same from the reaction system as the zinc is volatilized while leaving the lead and tin as marketable solder metal.

7. The process for treating mixed oxides of lead, tin and zinc which comprises smelting the mixed oxides under reducing conditions at temperatures sufficient to volatilize the zinc and continuously removing the volatilized zinc from the reaction system as the zinc becomes volatilized thereby effecting practically a complete removal of the zinc at temperatures substantially below those normally suitable for the distillation of zinc and recovering the lead and tin as a marketable solder metal.

8. The process for treating mixed oxides of lead, tin and zinc which comprises, in a single operation, smelting the mixed oxides with carbon under reducing conditions and at temperatures sufficient to volatilize the zinc while removing the zinc from the reaction system substantially as rapidly as it is volatilized thereby eliminating practically all of the zinc at temperatures substantially below those normally required for the distillation of zinc and reducing the lead and tin to a liquid alloy.

9. The process for treating mixed oxides of lead, tin and zinc which comprises smelting the oxides under reducing conditions and at temperatures effecting volatilization of the zinc while leaving the tin and lead as liquid metal.

10. The process for treating mixed oxides of lead, tin and zinc which comprises smelting the oxides under reducing conditions and at temperatures effecting volatilization of the zinc until the zinc is substantially completely removed while leaving the tin and lead as liquid metal and facilitating removal of the zinc by continuously flowing a reducing atmosphere around and through the mixture during smelting operations.

11. The process for refining copper alloys containing lead, tin and zinc which comprises melting the alloys under conditions favoring the oxidation of the tin, lead and zinc and the separation from the copper of the resulting mixed oxides as fume, recovering said fume and smelting the recovered fume to metal under reducing conditions favoring the continuous separation of the zinc from the lead and tin and the recovery of the said lead and tin as solder metal.

12. The process for refining copper alloy scrap containing copper, tin, lead and zinc which comprises treating the same in a converter thereby separating from the copper, the lead, tin and zinc as mixed oxides and smelting said oxides with carbon while continuously passing reducing gases over the charge thereby volatilizing the zinc and removing same from the system as it is volatilized while reducing the lead and tin to liquid metal.

13. The process for treating mixed oxides of lead, tin and zinc which comprises mixing the mixed oxides with coke and smelting the resulting mixture by firing the same in contact with a strongly reducing flame at temperatures from approximately 2350° F. to approximately 2400° F. to volatilize substantially all of the zinc while leaving the tin and lead as liquid metal.

JESSE O. BETTERTON.
ALBERT J. PHILLIPS.